United States Patent [19]

Mollo

[11] Patent Number: 5,577,341
[45] Date of Patent: Nov. 26, 1996

[54] ANIMAL TRAP

[75] Inventor: Michael J. Mollo, Monmouth Junction, N.J.

[73] Assignee: Rodentia, Inc., Jamesburg, N.J.

[21] Appl. No.: 406,580

[22] Filed: Mar. 20, 1995

[51] Int. Cl.⁶ .................................................. A01M 23/18
[52] U.S. Cl. ........................... 43/61; 43/58; 43/67
[58] Field of Search ..................... 43/58, 60, 61, 43/67

[56] References Cited

U.S. PATENT DOCUMENTS

| | | | |
|---|---|---|---|
| 1,495,607 | 5/1924 | Mellott | 43/61 |
| 2,518,819 | 8/1950 | Roessler | 43/61 |
| 3,343,744 | 9/1967 | Morell | 43/58 |
| 4,231,180 | 11/1980 | Bare | 43/61 |
| 4,462,181 | 7/1984 | Broman | 43/61 |
| 5,398,442 | 3/1995 | Musket | 43/58 |

Primary Examiner—Kurt Rowan
Attorney, Agent, or Firm—Thomas R. Farino, Jr., Esq.

[57] ABSTRACT

An improved animal trap in the shape of an expandable, collapsible, prismoidal box is made of cardboard and has a stiff square top and bottom and four side walls which are foldable to the outside along central folding lines by pressure onto the top. Each side wall has an inwardly extending tongue and at least two tongues on opposite side walls are connected by elastic bands or cntracting springs which pull the walls back from their folded position into a partially planar state as soon as the pressure on the top is released. The square tops are connected by a baited string which hold the trap in its partial planar state thus creating corner openings through which an animal may gain access to the trap interior and baited string. When the baited string is eaten, the contracting spring or rubber band pulls the walls to a fully planar position which now forms a closed prismoidal box thus trapping the animal inside.

8 Claims, 2 Drawing Sheets

ANIMAL TRAP

FIELD OF THE INVENTION

This invention relates to improved traps for capture and disposal of rodent and other small animals.

BACKGROUND OF THE INVENTION

There have been innumerable variations on the theme of traps for rodents and other small animals, including traps which are designed to capture the animals alive for humane relocation and those which are designed to kill the trapped animal. This field of invention is continually active; for example, U.S. Pat. No. 5,109,626 issued on May 5, 1992, and U.S. Pat. No. 5,010,682, issued on Apr. 30, 1991, involve traps designed to kill the trapped animal; and U.S. Pat. No. 5,005,312 issued on Apr. 9, 1991, and U.S. Pat. No. 4,984,382, issued on Jan. 15, 1991, disclose traps which are designed not to kill the trapped animal, illustrate these continuing efforts to invent the "perfect mouse trap."

These inventions, as well as a vast variety of other trapping devices previously invented and used for this purpose, all have certain characteristics and limitations which render them undesirable or ineffective in one way or another. For example, the most commonly-used trap, with a u-shaped, spring-loaded bar, results in the killing of an animal, but usually not without a certain amount of struggle on the part of the trapped animal. After successfully trapping of an animal with this type of trap, a certain amount of cleanup in the area where the animal is trapped is often required and the potential exists for the escape of various pests, such as fleas, which inhabited the animal prior to its demise. In addition, this type of trap poses some risk to the user in setting the trap and from inadvertent triggering if the trap must be moved or removed from a particular location. These characteristics are fairly typical of traps designed to kill an animal when the trap is sprung.

In general, the traps designed to capture an animal alive tend to be complex, bulky, or provide for a complicated or inconvenient entry point for the intended victim. Other traps such as the "Have-a-Hart" which provides for entry from either end, while relatively simple and straight forward, are expensive.

SUMMARY OF THE INVENTION

The preferred embodiment of my invention is comprised of rigid cardboard, which is folded to allow the cardboard to take the shape of a cube-like prismoid structure with angled sides. Inside the structure a contracting spring or rubber band pulls on two of the opposing walls, thus causing the structure to remain in a closed position.

In its baited and present form a small baited thread connects the square top and bottom which prevents the structure from fully closing thus allowing the four corners of the structure to remain open thereby providing four (4) access points for the intended animal.

In operation, an animal, such as a mouse, enters the structure to chew or lick the baited thread. When the baited thread becomes weakened, it breaks, and allows the contracting spring to pull the walls inward, thus trapping the mouse inside.

It is an object of the present invention to create a trap that is simple in design, economical to manufacture, easy to use, and is sanitary, readily disposable, and preferably biodegradable.

It is also an object of the present invention to provide an animal trap with a configuration that is appropriate for trapping of small and medium sized animals, including mice and other rodents; squirrels; possums; fur bearing animals such as mink, muskrat, and the like; skunks; and other similar sized animals by providing appropriate-sized versions of the present invention.

It is a further object of the present invention to provide a trap which is very compact for purposes of shipping and storage before use.

It is also an object of the present invention to provide a trap which may be baited with poison, in a manner ensuring that the bait is inaccessible to household pets, such as cats or dogs, but still readily accessible to the intended animals such as household rodents.

It is also an object of the present invention to provide a trap with multiple points of access; points of access which are in close proximity to animal pest runways, such as walls and a configuration which may be placed in corners; that is a configuration which permits ready access to the trap by the intended animal.

It is also an object of the invention to provide a trap that is disposable and allows the user to free the mouse if desired.

It is another object of the invention to provide a safe trap which comes pre-baited and ready to use to prevent children, pets, and others from having their fingers and paws caught in the trap.

It is another object of the invention to provide a trap that will help in the prevention of disease transmission.

It is another object of the invention to provide a trap that will be low in cost and environmentally safe.

It is another object of the invention to provide a trap that can be disposed of with a captured animal enclosed.

It is also an object of the invention to provide a trap that can be set and baited with virtually no effort on the part of the user.

SHORT DESCRIPTION OF THE DRAWINGS

DESCRIPTION OF A PREFERRED EMBODIMENT

The improved animal trap is illustrated in FIGS. 1 through 5, which depict the preferred embodiment.

Figure 1:
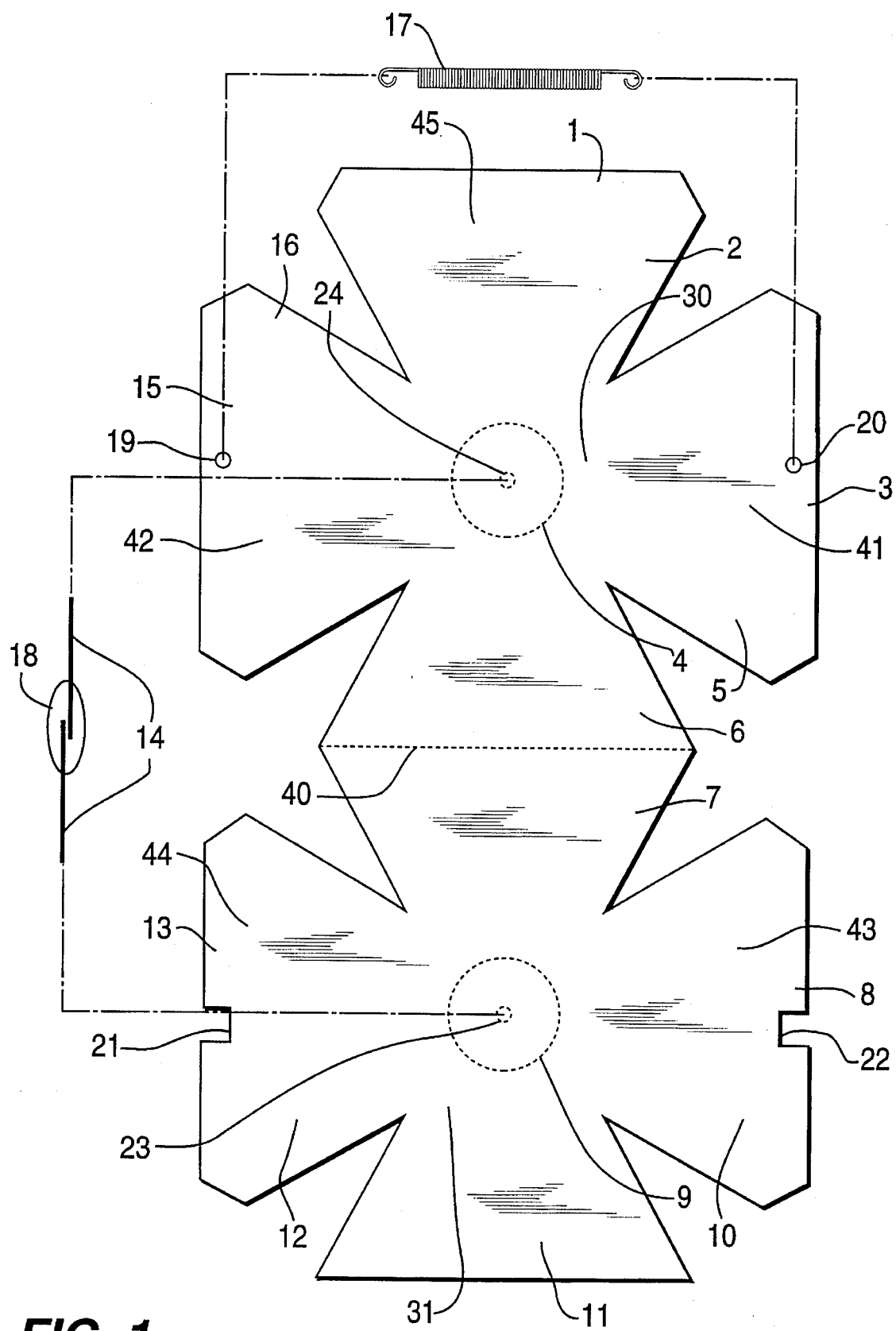
FIG. 1 is a plan view of a cardboard pattern depicting the components of the preferred embodiment of the invention in an unfolded assembly.
Figure 2:
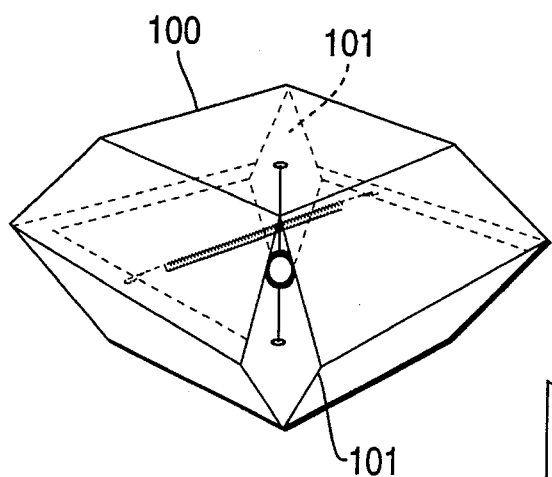
FIG. 2 illustrates an isometric view of the invention when set prior to trapping an animal.

FIG. 1 illustrates all of the components of the preferred embodiment of trap 100 disposed prior to assembly into the prismoidal shape as illustrated in FIG. 2, deployed in the set position. The components of the preferred embodiment, as illustrated in FIG. 1, include contracting spring 17, bait threads 14, bait 18, tabs 1, 3, 8, 13, 15, upper wall flaps 2, 5, 6, 16, lower wall flaps 7, 10, 11 12, top 30, bottom 31, eyelets 19 and 20, bait thread holes 23 and 24 and bait thread retainers 4 and 9.

The preferred embodiment as illustrated in FIG. 1, which can be made from cardboard, plastic, or any other suitable material, comprises wall flaps 2, 5, 6, and 16 which are hingedly attached to the sides of top 30. Tabs 1, 3, and 15 are hingedly attached to wall flaps 2, 5 and 16 respectively. Tab 15 contains eyelet 19 for the mounting of contracting spring 17 by placing the end of contracting spring 17 through eyelet 19. Tap 3 contains eyelet 20 through which the opposite end of contracting spring 17 is mounted when the trap 100 is assembled. Wall flap 6 is hingedly attached to wall flap 7, which is in turn hingedly attached to bottom 31. In addition, wall flaps 10, 11 and 12 are hingedly attached to bottom 31. Tabs 8 and 13 respectively are hingedly attached to wall flaps 10 and 12. Tab 8 has notch 22 located such that notch 22 aligns with eyelet 20 when trap 100 is assembled. Tab 13 contains notch 21, which is located to align the eyelet 19 when trap 100 is assembled. Top 30 contains thread hole 24, through which bait thread 14 is passed and attached to top 30 by bait thread retainer 4 when trap 100 is assembled. Bottom 31 contains bait thread hole 23, through which the bait thread is passed, and thread 14 is retained by bait thread retainer 9 when trap 100 is assembled.

The preferred embodiment as illustrated in FIG. 1 is assembled by folding wall flap 6 against wall flap 7 along their hinged junction 40. Before folding wall flaps 6 and 7 together tabs 3 and 15, attached to wall flaps 5 and 16 respectively, are folded along junctions 41 and 42. Tabs 8 and 13 are also folded along junctions 43 and 44. Tabs 3, 15, 8 and 13 are folded such that when flaps 6 and 7 are folded along junction 40, tab 8 comes into contact with tab 3, and tab 13 comes into contact with tab 15, such that eyelet 20 is aligned with notch 22, and eyelet 19 is aligned with notch 21. At this point in the assembly of trap 100, tab 8 is attached to tab 3 by glue or other means, and tab 13 is attached to tab 15 in like manner. At this point in the assembly process, trap 100 can be opened to create a space between top 30 and bottom 31, so that thread 14 can be inserted through thread hole 24 in top 30 and thread 14 secured to top 30 by bait thread retainer 4.

Figure 3:
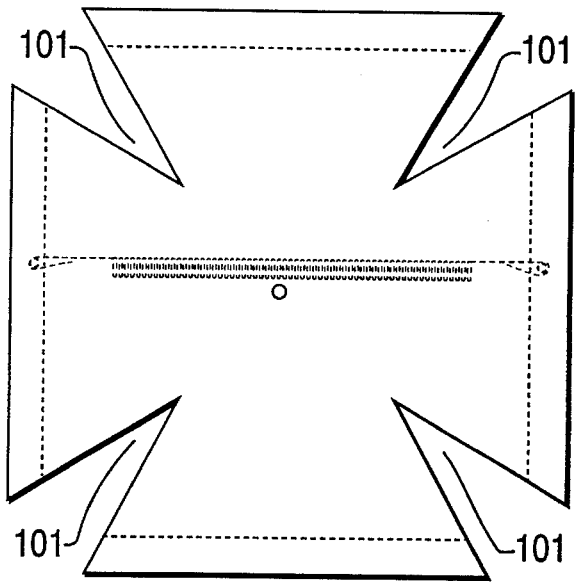
FIG. 3 is a top elevation of the invention when set prior to trapping an animal.

In the preferred embodiment, bait thread retainer 4 is a disc with adhesive which causes the thread to be held in place on top 30. The other end of bait thread 14 is passed through bait thread hole 23 in bottom 31, and secured with bait thread retainer 9 in a like manner. The length of bait thread 14 inside trap 100 must be such that corner openings 101 (as illustrated in FIGS. 2 and 3) are open sufficiently to permit the entry of the animal for which the trap is intended.

The next step in the assembly of trap 100 involves the attachment of one end of contracting spring 17 to eyelet 19 and the stretching of said contracting spring 17 to attach the opposite end to eyelet 20. After contracting spring 17 is attached to eyelets 19 and 20, wall flap 11 is folded along with wall flap 2, so that wall flap 11 comes into contact with wall flap 2 along junction 45, and tab 1 is then glued to wall flap 11 to complete assembly of trap 100.

At this point, trap 100 is ready to be placed for use or stored. If trap 100 is to be stored, top 30 is pressed down toward bottom 31, so that trap 100 is flattened as illustrated in FIG. 3. Contracting spring 17 is stretched, and bait thread 14 containing bait 18 are contained loosely within trap 100.

Figure 4:
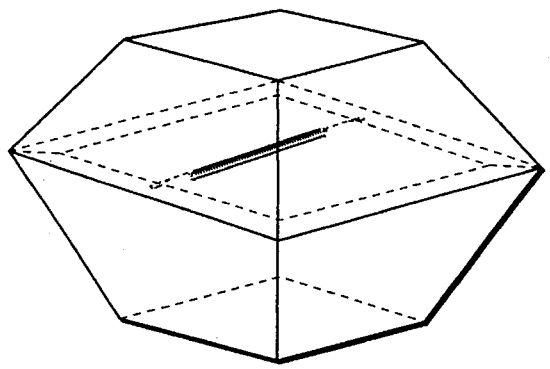
FIG. 4 is a perspective of the invention after the trap has sprung and an animal has been trapped inside.
Figure 5:
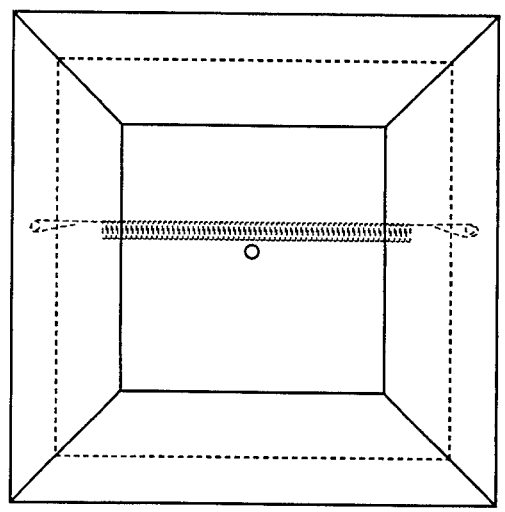
FIG. 5 is a top view of the invention after the trap has sprung and an animal has been trapped inside.

Trap 100 is utilized for trapping the desired small animal by placing the trap in the desired location. The animal to be trapped enters the trap through corner opening 101 and proceeds to eat bait 18, which in turn causes bait thread 14 to part. At this point, contracting spring 17 pulls tab 15 and tab 3 towards each other, which in turn causes wall flaps 2, 5, 6, and 16 to hinge, as well as bottom flaps 7, 10, 11 and 12, resulting in the closure of corner openings 101, as illustrated in FIGS. 4 and 5. As a result, the animal which has entered the trap and eaten the bait is trapped therein.

The description set forth herein is intended to illustrate the preferred embodiment, but is not intended to limit the scope of the present invention.

I have determined that the preferred shape for the structure is a prismoidal shape with four equal sized upper and lower side walls. It is also possible to build the trap in many shapes with many numbers and sizes of side walls. For example, a prismoidal structure with three, four, five or more symmetrical or unsymmetrical upper and lower side walls may be used to practice this invention. Also I have found that it is possible to have two upper and lower side walls if appropriate rigid flaps are attached to each side wall. In the preferred embodiment, which incorporates four upper and lower walls, the openings at the corners are sufficiently large to facilitate entry into the trap. The use of more walls reduces the size of the corner openings and may result in openings too small for intended animal. However, selection of the size of the corner opening may be used to prevent larger animals which are not intended to be trapped from having access to the bait.

The trap can be constructed from many different materials, such as wood, plastic, metal, fiberglass and other such materials that are lightweight and flexible. The preferred embodiment would be made of cardboard or plastic.

I have also determined that there are many possible devices suitable for use as a contracting means.

In the case of the contracting means, a coil type spring made of metal is preferred, although it may be replaced with a rubber band, flex steel, plastic spring, bungee cord, expanding spring, etc. I have found these other methods to be less desirable due to the cost or the fact that the trapped animal can chew through the contracting means and cause the trap to fail.

The baited thread (or trigger) can also be made from different materials. The preferred method used a trigger made from two pieces of unconnected thread which are held together by the bait. The trigger can also be made from a continuous piece of thread, a latching method or any other material that can hold the top and bottom of the trap against the tension from contracting means in the set position. These alternative materials include, but are not limited to, fishing line, plastic thread, paper thread, hairs and so on.

The bait can consist of any material that would attract the intended animal such as fish based byproducts, vegetable based products, pet foods, etc. In the preferred embodiment a combination of peanut butter and dough which is baked after embedding the ends of the trigger threads in the mixture is used for the bait.

The trap is set by attaching one end of the trigger thread to the bottom of the trap by inserting the thread through a hole in the center of the bottom and tying off the thread. The other end of the trigger thread is inserted through a hole in the center of the top of the trap and tied off so that the four corners of the trap are held open. After trigger threads are tied off, the trap is ready for use with the bait located inside in the approximate center of the trap. At this point the trap can be placed for use or stored. If the trap is to be stored, the top and bottom can be pressed to flatten the trap and then wrapped, banded or clipped to keep the trap in its flat configuration until such time as the trap is to be used.

The inside surface of the trap may also be lined with a foil in order to deter the trapped animal from eating his way out of the cardboard trap.

It is understood that the above description of the improved animal trap is merely illustrative of the application of the principals of this invention, and other variations, modifications, or embodiments including the use of other materials or means for the elements and the cooperation among and between the elements may be made without departing from the intent and scope of this invention.

I claim:

1. An improved animal trap in the shape of a collapsible, expandable, prismoidal box folded from a blank of stiff sheet material, said trap having an inside and an outside, adapted to be collapsed into a first partially-closed position by pressure on its top and to be expanded into a second fully-closed position by internal contracting means upon release of said pressure, said trap comprising:

a top and a bottom of identical square configuration in parallel alignment each being provided with at least one perforation;

four trapisoidal side walls hingedly attached to the edges of said top and said bottom, each said side wall being adapted to fold outwardly about a central folding line parallel to said edge of said top and bottom, by pressure applied onto said top urging it toward said bottom;

four tabs each of a width of said side walls, one tab each being hingedly attached to the inside of one of said side walls along said central folding line, and two of said tabs being provided with at least one perforation;

at least one elastic contracting means attached to said tabs on opposite side walls by means of said perforations, and adapted to pull said opposite walls into bent planes oblique to the planes of said top and said bottom upon release of pressure on said top; and trigger means attached to said top and bottom by means of said perforations said trigger causing said trap to be held in said first partially-closed position and upon triggering to permit said trap to fully close.

2. The trap of claim 1, wherein said elastic contracting means is in the shape of an elastic band, attached to two opposite tabs by means of said perforations.

3. The trap of claim 1, wherein said elastic contracting means is in the shape of an helical spring, said spring having its ends attached to two opposite tabs by means of said perforations.

4. The trap of claim 1, wherein said perforations in said tabs are in the shape of circular holes.

5. The trap of claim 1, wherein said perforations in said top and bottom are in the shape of circular holes.

6. The trap of claim 1, wherein said trigger means comprises a baited strand of string.

7. The trap of claim 1, wherein said stiff sheet material comprises cardboard.

8. The trap of claim 1, wherein said stiff sheet material comprises plastic.

\* \* \* \* \*